United States Patent
Mossoba et al.

(10) Patent No.: US 10,931,822 B2
(45) Date of Patent: *Feb. 23, 2021

(54) INTERACTING WITH AN INTERACTIVE VOICE RESPONSE SYSTEM DEVICE OR AGENT DEVICE OF AN ORGANIZATION

(71) Applicant: Capital One Services, LLC, McLean, VA (US)

(72) Inventors: Michael Mossoba, Arlington, VA (US); Joshua Edwards, Philadelphia, PA (US); Abdelkadar M'Hamed Benkreira, Washington, DC (US); Alexandra Colevas, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/577,195

(22) Filed: Sep. 20, 2019

(65) Prior Publication Data

US 2020/0228654 A1    Jul. 16, 2020

Related U.S. Application Data

(63) Continuation of application No. 16/249,160, filed on Jan. 16, 2019, now Pat. No. 10,425,533.

(51) Int. Cl.
*H04M 3/51* (2006.01)
*G10L 15/26* (2006.01)
(Continued)

(52) U.S. Cl.
CPC .......... *H04M 3/5166* (2013.01); *G10L 15/18* (2013.01); *G10L 15/26* (2013.01); *H04M 3/42059* (2013.01)

(58) Field of Classification Search
CPC . H04M 3/42059; H04M 3/5166; G10L 15/18; G10L 15/26
(Continued)

(56) References Cited

U.S. PATENT DOCUMENTS 7,580,374 B1 * 8/2009 Gilbert ................ H04L 12/1818
370/260
9,888,117 B1   2/2018 Ranganath et al.
(Continued)

FOREIGN PATENT DOCUMENTS

EP    3063646 A1    9/2016

OTHER PUBLICATIONS

Leviathan Y., et al., "Google Duplex: An AI System for Accomplishing Real-World Tasks over the Phone," May 8, 2018, 13 pages.
(Continued)

*Primary Examiner* — Hemant S Patel
(74) *Attorney, Agent, or Firm* — Harrity & Harrity, LLP

(57) ABSTRACT

A device receives, from a user device, a communication request that includes information identifying a user of the user device, an organization, and at least one reason for the communication request. The device determines, based on the communication request, information concerning the user, a telephone number associated with the organization, and a menu of an interactive voice response (IVR) system device associated with the telephone number. The device communicates, based on the information concerning the user, the menu of the IVR system device, and the at least one reason for the communication request, with the IVR system device via a communication session initiated based on the telephone number. The device determines, based on communicating with the IVR system device, a time that the user is to interact with the IVR system device via the commu-
(Continued)

nication session, and causes the user device to join the communication session at the time.

20 Claims, 11 Drawing Sheets

(51) Int. Cl.
*G10L 15/18* (2013.01)
*H04M 3/42* (2006.01)

(58) Field of Classification Search
USPC .............. 348/14.01–14.16; 379/67.1–88.28, 379/265.01–266.1, 88.18, 201.01, 379/202.01–207.01; 370/351–357; 709/201–207, 217–248
See application file for complete search history.

(56) References Cited

U.S. PATENT DOCUMENTS

| 10,425,533 | B1* | 9/2019 | Mossoba ................ G10L 15/26 |
| 2005/0147219 | A1 | 7/2005 | Comerford et al. |
| 2007/0280464 | A1* | 12/2007 | Hughes ................ H04M 7/003 379/205.01 |
| 2012/0136790 | A1 | 5/2012 | Templeton |
| 2013/0329865 | A1* | 12/2013 | Ristock ................ H04M 3/567 379/88.01 |
| 2017/0374198 | A1 | 12/2017 | De Silva et al. |

OTHER PUBLICATIONS

Extended European Search Report and Written Opinion for Application No. EP20152143.2, dated Jun. 15, 2020, 9 pages.

* cited by examiner

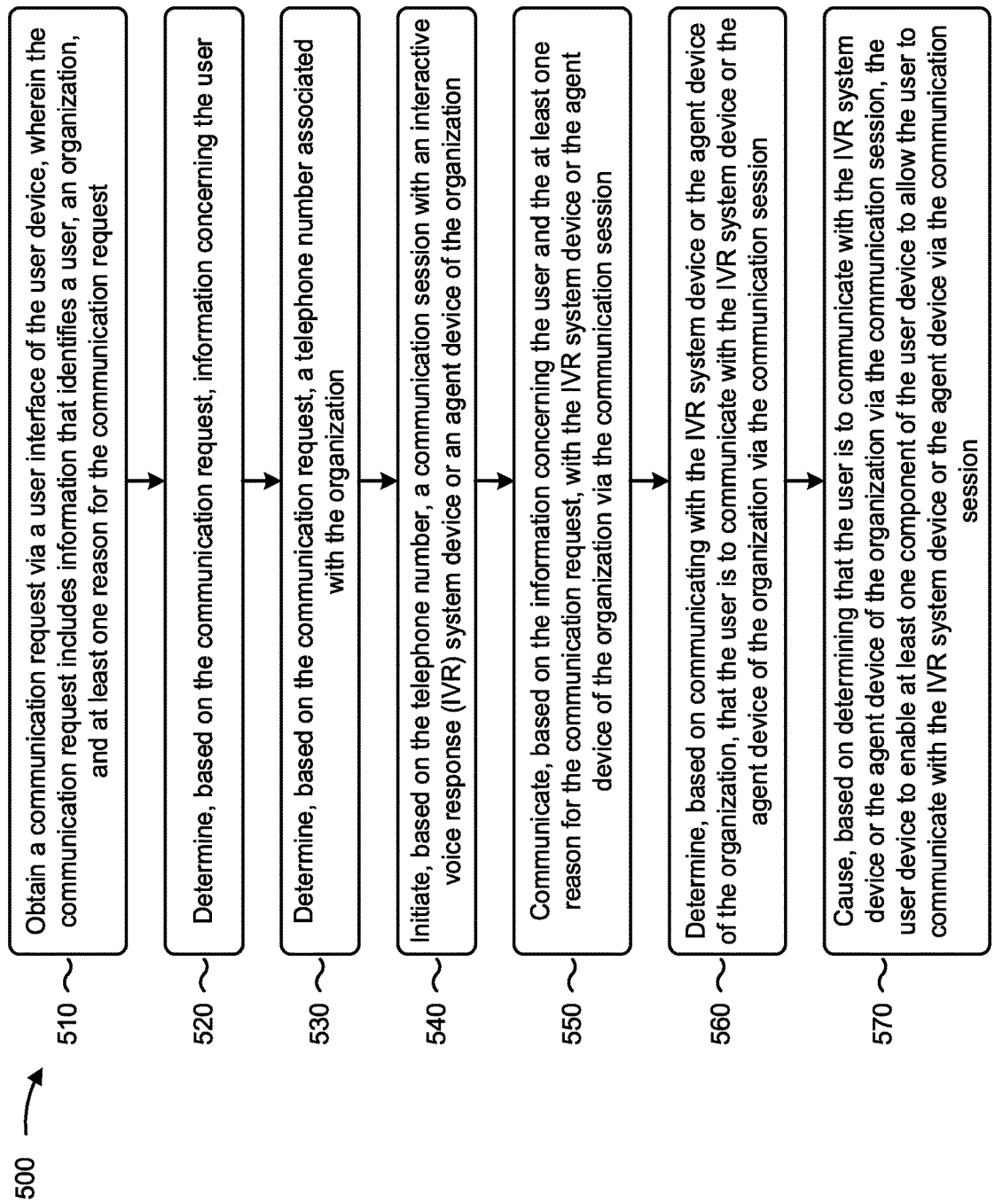

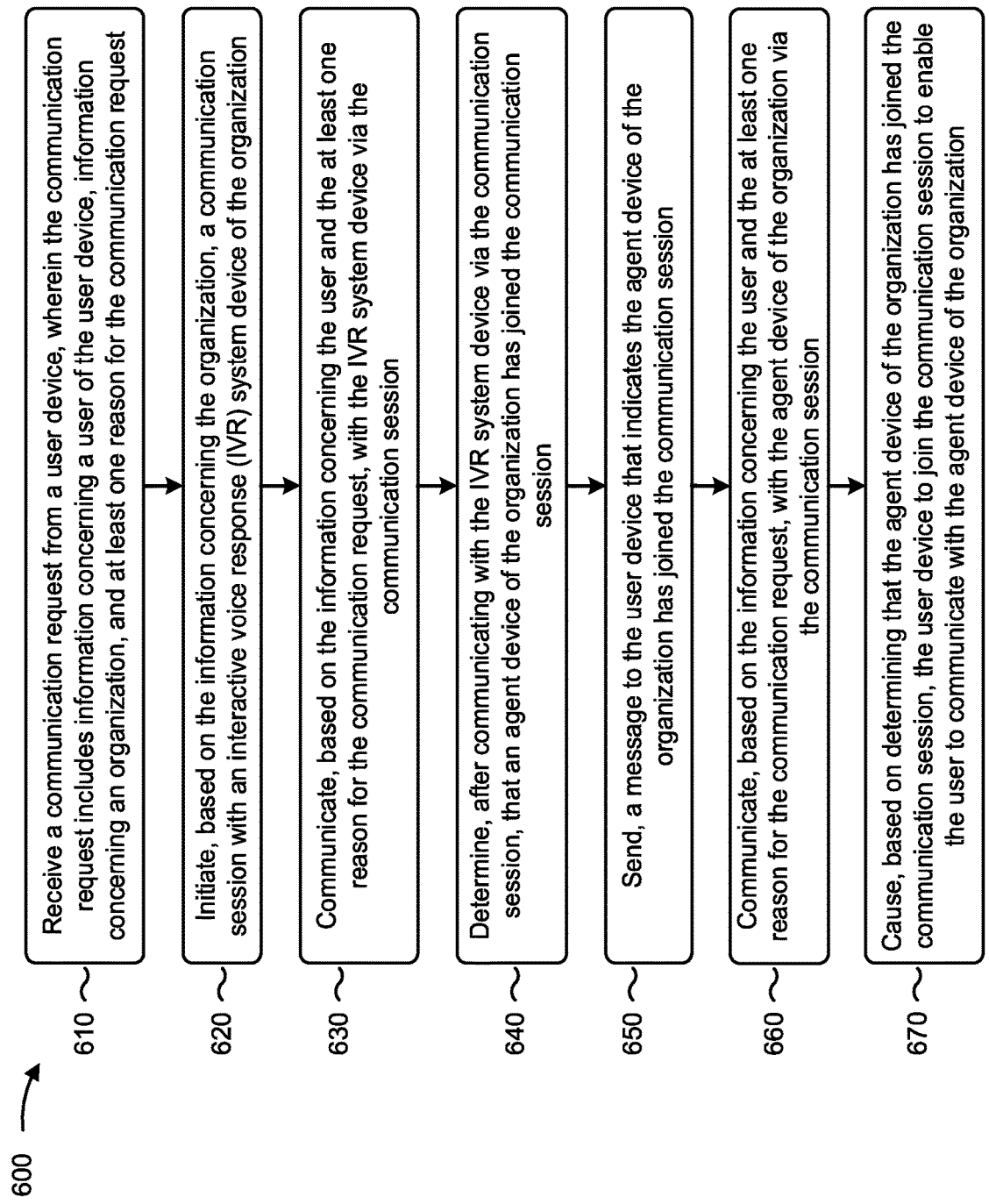

INTERACTING WITH AN INTERACTIVE VOICE RESPONSE SYSTEM DEVICE OR AGENT DEVICE OF AN ORGANIZATION

RELATED APPLICATION

This application is a continuation of U.S. patent application Ser. No. 16/249,160, filed Jan. 16, 2019 (now U.S. Pat. No. 10,425,533), which is incorporated herein by reference.

BACKGROUND

Interactive voice response (IVR) allows a communication device to interact with humans through the use of voice and dual-tone multi-frequency signaling (DTMF) tones. IVR technology allows users to interact with an organization's host system via a telephone keypad or by voice, after which services can be inquired about through an IVR dialogue. IVR systems can respond with prerecorded or dynamically generated audio to further direct users on how to proceed.

SUMMARY

According to some implementations, a device may include one or more memories, and one or more processors, communicatively coupled to the one or more memories, to receive a communication request from a user device, wherein the communication request includes information that identifies a user of the user device, an organization, and at least one reason for the communication request. The one or more processors may determine, based on the communication request, information concerning the user, and determine, based on the communication request, a telephone number associated with the organization. The one or more processors may determine, based on the communication request, a menu of an interactive voice response (IVR) system device associated with the telephone number, and initiate, based on the telephone number, a communication session with the IVR system device. The one or more processors may communicate, based on the information concerning the user, the menu of the IVR system device, and the at least one reason for the communication request, with the IVR system device via the communication session. The one or more processors may determine, based on communicating with the IVR system device, a time that the user is to interact with the IVR system device via the communication session, and cause the user device to join the communication session at the time.

According to some implementations, a non-transitory computer-readable medium may store instructions that include one or more instructions that, when executed by one or more processors of a device, cause the one or more processors to obtain a communication request via a user interface of the user device, wherein the communication request includes information that identifies a user, an organization, and at least one reason for the communication request, and determine, based on the communication request, information concerning the user. The one or more instructions may cause the one or more processors to determine, based on the communication request, a telephone number associated with the organization, and initiate, based on the telephone number, a communication session with an interactive voice response (IVR) system device or an agent device of the organization. The one or more instructions may cause the one or more processors to communicate, based on the information concerning the user and the at least one reason for the communication request, with the IVR system device or the agent device of the organization via the communication session, and determine, based on communicating with the IVR system device or the agent device of the organization, that the user is to communicate with the IVR system device or the agent device of the organization via the communication session. The one or more instructions may cause the one or more processors to cause, based on determining that the user is to communicate with the IVR system device or the agent device of the organization via the communication session, the user device to enable at least one component of the user device to allow the user to communicate with the IVR system device or the agent device via the communication session.

According to some implementations, a method may include receiving, by a device, a communication request from a user device, wherein the communication request includes information concerning a user of the user device, information concerning an organization, and at least one reason for the communication request. The method may include initiating, by the device and based on the information concerning the organization, a communication session with an interactive voice response (IVR) system of the organization, and communicating, by the device and based on the information concerning the user and the at least one reason for the communication request, with the IVR system device via the communication session. The method may include determining, by the device and after communicating with the IVR system device via the communication session, that an agent device of the organization has joined the communication session, and sending, by device, a message to the user device that indicates the agent device of the organization has joined the communication session. The method may include communicating, by the device and based on the information concerning the user and the at least one reason for the communication request, with the agent device of the organization via the communication session, and causing, by the device and based on determining that the agent device of the organization has joined the communication session, the user device to join the communication session to enable the user to communicate with the agent device of the organization.

BRIEF DESCRIPTION OF THE DRAWINGS

FIGS. 4-6 are flow charts of example processes for interacting with an interactive voice response system device or agent device of an organization.

DETAILED DESCRIPTION

Figure 1A:
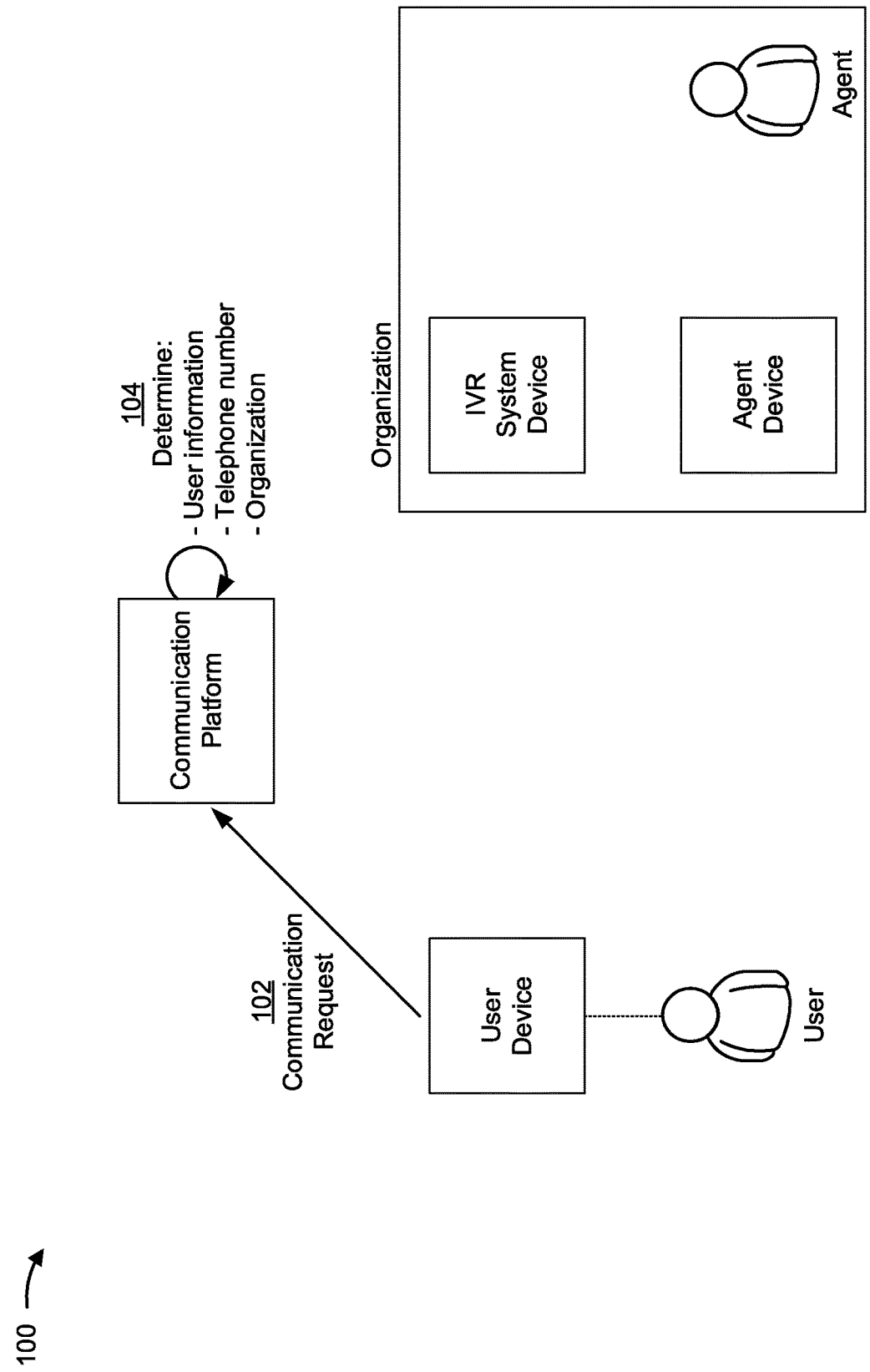
FIGS. 1A-1F are diagrams of an example implementation described herein.

The following detailed description of example implementations refers to the accompanying drawings. The same reference numbers in different drawings may identify the same or similar elements.

In many cases, a user calls, via a user device, a telephone number of an organization to interact with an interactive voice response (IVR) system and/or agent (e.g., via an agent device) of the organization. In some cases, the user communicates with the IVR system and/or agent to obtain information (e.g., determine a balance of a financial account)

and/or to cause an action to be performed (e.g., transfer money between financial accounts). In some cases, the user communicates fundamental information, such as a name of the user, an address of the user, an identification of the user, an identification of an account of the user, a reason for calling, and/or the like to the IVR system and/or agent at the outset of a call, before being able to obtain the information and/or cause the action to be performed. Conveying the fundamental information can take a significant amount of time, and use a significant amount of resources, such as processing resources, memory resources, communication resources, power resources, and/or the like, of the IVR system, the agent device of the agent, the user device of the user, and/or a network that facilitates communication between the user device and the IVR system and/or the agent device. Moreover, interacting with the IVR system requires the user to utter responses to queries that can be misinterpreted by the IVR system, which can result in the IVR system not presenting the correct information to the user and/or not connecting the user to the correct agent. In such cases, the user cannot obtain the information and/or cannot cause the action to be performed, which causes the user to repeatedly call the organization, which results in increased usage of resources of the IVR system, the agent device, the user device, and/or the network.

Some implementations described herein provide a communication platform that communicates with an IVR system device and/or an agent device of an organization to convey the fundamental information and that determines when a user of a user device is to communicate with the IVR system device and/or the agent device. In some implementations, the communication platform obtains a communication request from the user device and determines, based on the communication request, information concerning the user, a telephone number, a menu of an IVR system device associated with the telephone number, and/or the like. In some implementations, the communication platform initiates, based on the telephone number, a communication session with the IVR system device and/or the agent device and communicates with the IVR system device and/or agent device via the communication session based on the information concerning the user, the menu of the IVR system device, and/or the like. In some implementations, the communication platform may determine, based on communicating with the IVR system device and/or the agent device, that the user is to communicate with the IVR system device and/or the agent device via the communication session. In some implementations, the communication platform may cause the user device to join the communication session to enable the user to communicate with the IVR system device and/or the agent device via the user device.

In this way, the communication platform automatically conveys the fundamental information to the IVR system device and/or the agent device, which reduces the need for the user device to use resources to enable the user to communicate with the IVR system device and/or the agent device. Moreover, the communication platform directly interacts with the IVR system device and/or the agent device, which may reduce a likelihood of conveying incorrect information to the IVR system device and/or the agent device and/or reduce a likelihood of the IVR system device and/or the agent using the agent device misinterpreting what the communication platform is communicating. This can reduce the amount of time that a communication session is established to obtain the information and/or cause the action to be performed, which can reduce the amount of resources, such as processing resources, memory resources, power resources, communication resources, and/or the like used by the user device, the organization, and/or a network that provides the communication session.

FIGS. 1A-1F are diagrams of an example implementation 100 described herein. As shown in FIG. 1A, example implementation 100 may include a user device, a communication platform, an interactive voice response (IVR) system device of an organization, and/or an agent device of the organization. In some implementations, the user device, the communication platform, the IVR system device, and/or the agent device may communicate via one or more communication sessions. In some implementations, the user device and/or the agent device may be a communication and/or computing device, such as a mobile phone, a smartphone, a laptop computer, a tablet computer, and/or the like. In some implementations, a user using the user device and/or the communication platform may interact, via the one or more communication sessions, with an agent of the organization using the agent device through the use of voice (e.g., the user talks with the agent and/or the communication platform generates speech to communicate to the agent). In some implementations, the communication platform and/or the IVR system device may be a computing device, a server, a cloud computing device, and/or the like. In some implementations, the user using the user device and/or the communication platform may interact, via the one or more communication sessions, with the IVR system device through the use of voice and/or dual-tone multi-frequency signaling (DTMF) tones.

Some example implementations described herein concern a single user device, communication platform, IVR system device, and/or agent device, but implementations may include a plurality of user devices, communication platforms, IVR system devices, and/or agent devices. In some implementations, the user device, the communication platform, the IVR system device, and/or the agent device may be connected via a network, such as the internet, an intranet, and/or the like.

As shown in FIG. 1A and by reference number 102, the user device may send a communication request to the communication platform. In some implementations, the user may interact, via a user interface of the user device, with an application and/or a program running on the user device to cause the user device to generate the communication request. In some implementations, the user may enter, via the user interface of the user device and the application and/or the program, the communication request into the user device. In some implementations, the communication request may indicate that the user device and/or the communication platform is to initiate a communication session with the IVR system device and/or the agent device of the organization. In some implementations, the communication request may include information that identifies the user, the organization, at least one reason for the communication request, and/or the like. In some implementations, the communication request may include information that concerns the user, such as a name of the user; an address of the user; a username of the user; an identification string of the user; a password of the user; a security response of the user (e.g., an answer to a personal question that is unique and/or specific to the user); an identifier of an account of the user, and/or the like. In some implementations, the user device may send the communication request to the communication platform and the communication platform may receive the communication request from the user device.

As shown by reference number 104, the communication platform may process the communication request to determine the information that identifies the user, the organization, the at least one reason for the communication request, and/or the like. In some implementations, the communication platform may process the communication request to determine the information concerning the user, the organization, the at least one reason for the communication request, and/or the like. For example, the communication platform may parse the communication request to obtain the information that concerns the user. As another example, the communication platform may parse the communication request to obtain the information that identifies the user and perform a lookup, based on the information that identifies the user, in a data structure to obtain the information that concerns the user.

In some implementations, the communication platform may process the communication request to determine a telephone number, a communication address (e.g., an email address, an instant messaging username, a chatroom identifier, and/or the like), and/or the like associated with the organization. For example, the communication platform may parse the communication request to obtain the information that identifies the organization and perform a lookup, based on the information that identifies the organization, in a data structure to obtain the telephone number, the communication address, and/or the like.

In some implementations, the communication platform may determine, based on the telephone number, the communication address, and/or the like, at least one menu of the IVR system device of the organization. In some implementations, the communication platform may initiate a plurality of communication sessions for multiple users to automatically perform numerous communications (e.g., hundreds, thousands, millions, etc. communications) with the IVR system device, as described herein, to navigate a menu tree of the IVR system device for each communication session. Over time, based on traversing different portions of the menu tree via the numerous communications, the communication platform may determine information about one or more menus, one or menu branch, and/or the like, of the menu tree. For example, for any given menu of the menu tree, the communication platform, via the numerous communications, may process the menu using a natural language processing technique, such as a voice-to-text technique, to determine one or more of the options presented by the menu, select an option of the one or more options to determine information about an additional menu and select one or more of the options presented by the additional menu to determine information about another menu. In this way, the communication platform may obtain and store information about at least one menu of the IVR system based on the numerous communications with the IVR system device. Accordingly, the communication platform may determine the at least one menu of the IVR system device by obtaining the information about the at least one menu from storage.

Figure 1B:
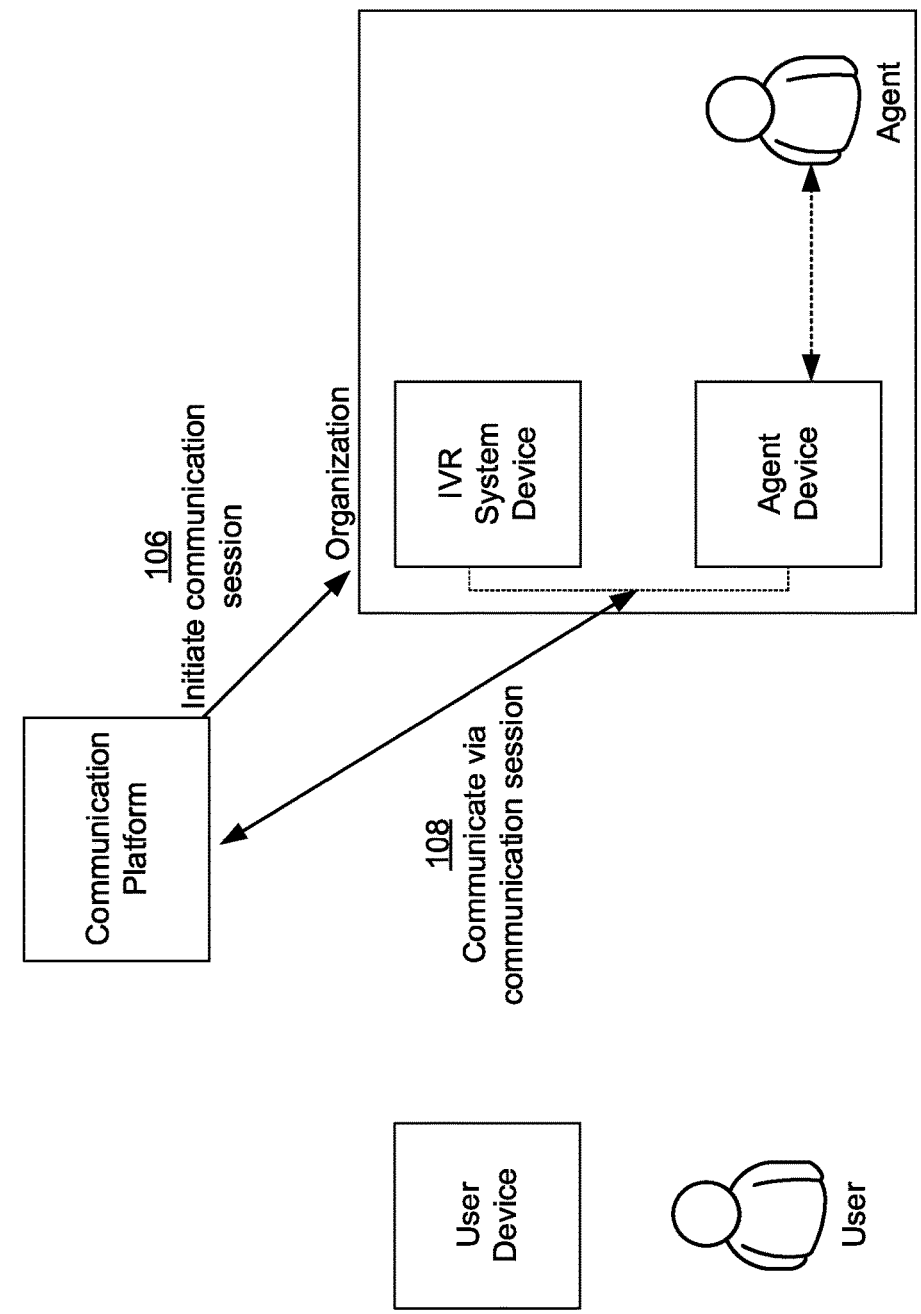

As shown in FIG. 1B and by reference number 106, the communication platform may initiate a communication session with the IVR system device and/or the agent device of the organization. For example, the communication platform may initiate the communication session to communication with the IVR system device and/or the agent of the organization that uses the agent device. In some implementations, the communication platform may initiate the communication session device based on the telephone number, the communication address, and/or the like. For example, the communication platform may dial the telephone number to initiate the communication session.

As shown by reference number 108, the communication platform may communicate with the IVR system device (e.g., based on determining the at least one menu of the IVR system device) and/or the agent device of the organization via the communication session. For example, the communication platform may receive a first communication, such as a first speech, a first spoken-word communication, a first text-to-speech communication, at least one prompt, and/or the like from the IVR system device and/or the agent device. In some implementations, the communication platform may process the first communication using a natural language processing technique, such as a voice-to-text technique, to determine at least one word of the first communication. For example, the communication platform may receive a spoken-word prompt from the IVR system device and process the spoken-word prompt to determine one or more words concerning at least one query of the spoken-word prompt. In some implementations, the communication platform may process the at least one word of the first communication to determine a response. For example, the communication platform may determine, based on the information concerning the user, the menu of the IVR system, the at least one reason for the communication request, and/or the like, at least one answer to the at least one query. Furthermore, the communication platform may process the response using a text-to-speech technique to generate a second communication, such as a second speech, a second spoken-word communication, a second text-to-speech communication (e.g., at least one text-to-speech word), at least one response, at least one dual tone multi-frequency (DTMF) tone, and/or the like. For example, the communication platform may generate, based on the at least one answer, a spoken-word response to at least one query using a text-to-speech technique.

In some implementations, the communication platform may send the second communication to the IVR system device and/or the agent device. For example, the communication platform may send the spoken-word response to the IVR system device. In this way, the communication platform may receive a first communication from the IVR system device and/or the agent device and generate, based on the first communication, a second communication, and send the second communication to the IVR system device.

In some implementations, the communication platform and the IVR system device may communicate one or more first communications and one or more second communications in this way to navigate the menu tree of the IVR system device (e.g., the IVR system device provides a prompt concerning a menu of the menu tree and the communication platform provides a response that causes the IVR system device to provide a prompt that concerns an additional menu of the menu tree). This allows the communication platform to automatically communicate key information to the IVR system device and/or traverse part of the menu tree without the user needing to interact with the IVR system device. In some implementations, the communication platform may store the one or more first communications and the one or more second communications to log the communications of the communication platform and the IVR system device.

In some implementations, the communication platform may communicate with the IVR system device and/or agent device via the communication session without the user device needing to interact with the IVR system device and/or the agent device. In some implementations, the communication platform may accomplish the at least one reason for the communication request by communicating with the IVR system device and/or agent device. In such cases, the communication platform may terminate the communication session and/or send a message to the user device indicating that the communication platform accomplished the at least one reason for the communication request. For example, where a user wants to transfer money from a first financial account to a second financial account at a financial institution, the communication platform may initiate a communication session with an IVR system device and/or agent device of the financial institution; communicate with the IVR system device and/or agent device to cause the first financial account to transfer money to the second financial account; determine a confirmation number associated with the transfer by communication with IVR system device and/or the agent device; terminate, based on determining the confirmation number, the communication session; and send a message to a user device of the user that includes the confirmation number and indicates that the transfer is complete.

Figure 1C:
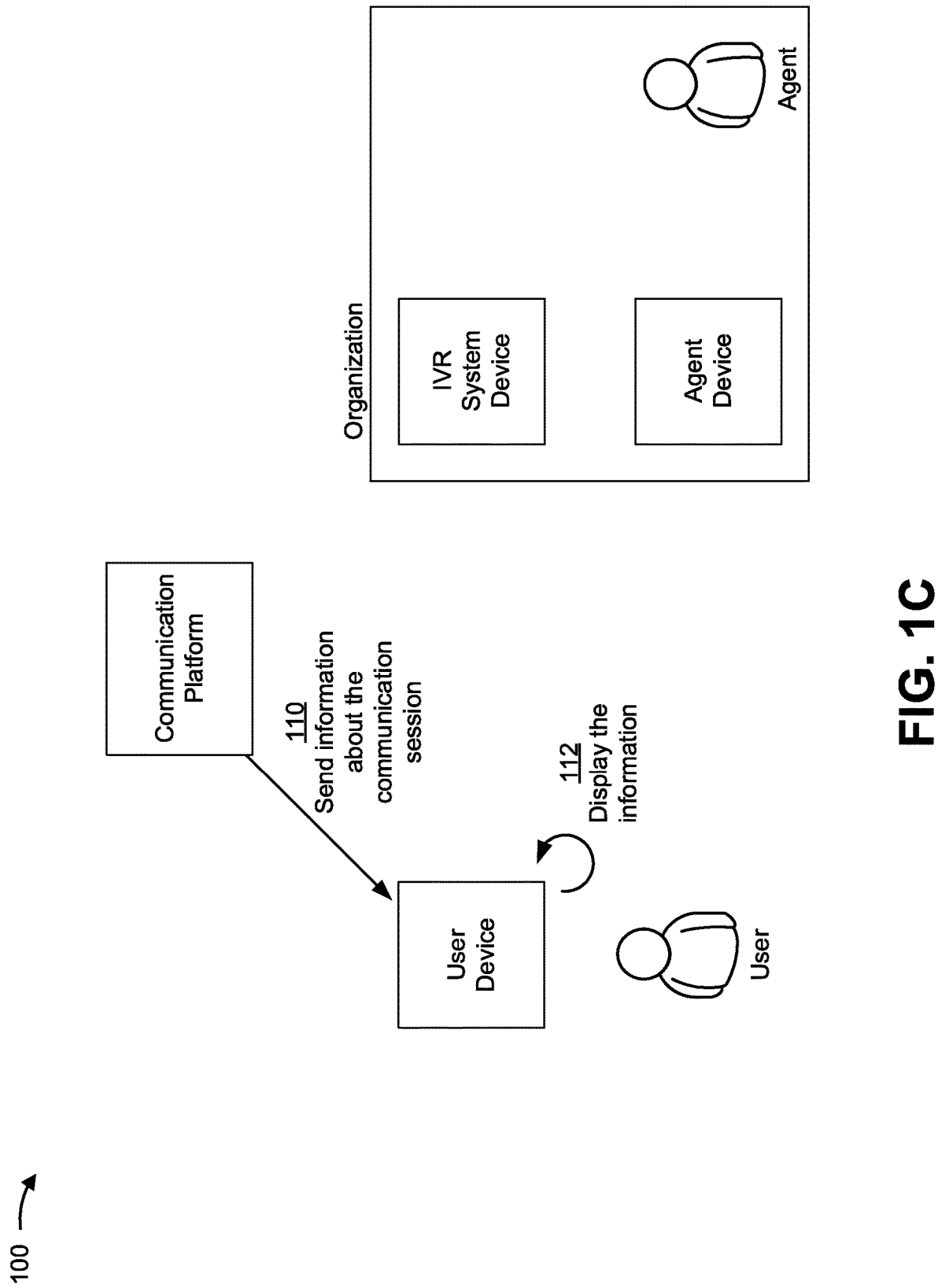

As shown in FIG. 1C and by reference number 110, the communication platform may send information about the communication session to the user device. For example, the information about the communication session may include the one or more first communications and/or the one or more second communications. As another example, the communication platform may create a transcription of the one or more first communications and/or the one or more second communications (e.g., by using a speech-to-text technique to process the one or more first communications and/or the one or more second communications) and include the transcription in the information about the communication session. In another example, the information about the communication session may include one or more words of the one or more first communications and/or one or more words of the one or more second communications. In some implementations, the communication platform may send the information about the communication session to the user device in real-time (e.g., as the information about the communication session is received and/or determined). Additionally, or alternatively, the communication platform may send the information about the communication session to the user device at a particular time (e.g., on a scheduled basis, on an on-demand basis, on a triggered basis, and/or the like).

As shown by reference number 112, the user device may receive the information about the communication session and display the information about the communication session. For example, the user device may receive and process the information about the communication session to determine the transcription and display the transcription on the display of the user device. In some implementations, receiving the information about the communication session by the user device causes the display of the user device to display the information about the communication session. For example, receiving the information about the communication session by the user device may cause the display of the user device to display the one or more words of the one or more first communications and/or one or more words of the one or more second communications.

In some implementations, the user device may receive and process the information about the communication session to determine information to display. For example, the user device may transcribe and display the one or more first communications and/or the one or more second communications as the one or more first communications and/or the one or more second communications are received by the user device. As another example, the user device may determine timing information, such as an initiation time, a duration of time, and/or an end time associated with each communication of the one or more first communications and/or the one or more second communications, and display the timing information (e.g., display a time stamp for each communication).

Figure 1D:
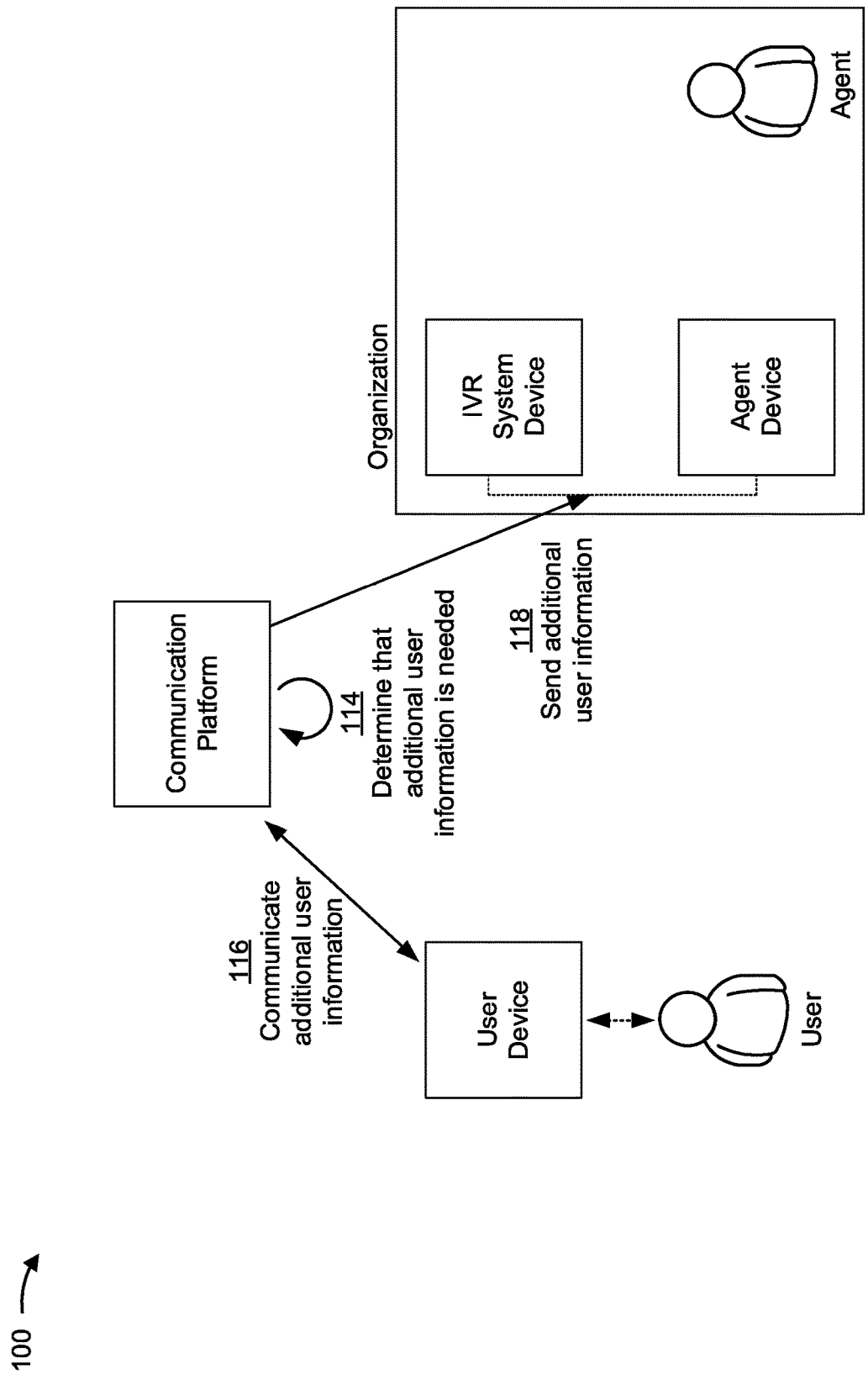

As shown in FIG. 1D and by reference number 114, the communication platform may determine that additional information concerning the user is needed. For example, while communicating with the IVR system device and/or the agent device, the communication platform may receive a prompt that the communication platform does not know how to answer (e.g., the information concerning the user does not include information to respond to the prompt, such as a security question). Additionally, or alternatively, before initiating the communication session, the communication platform may determine that additional information concerning the user is needed based on determining the at least one menu of the IVR system device. For example, the communication platform may determine that the IVR system device may present a menu that asks for additional information concerning the user that communication platform does not have.

As shown by reference number 116, the communication platform may send a message to the user device that includes a query regarding the additional information concerning the user. In some implementations, the user device may receive the message and display the query on the display of the user device. In some implementations, receiving the message by the user device causes the display of the user device to display the query. In some implementations, the user may enter, via the user interface of the user device and the application and/or the program of the user device, a response to the query. In some implementations, the response includes and/or is based on the additional information concerning the user. In some implementations, the user device sends the response to the communication platform. In some implementations, the communication platform receives and processes the response to determine the additional information concerning the user. As shown by reference number 118, the communication platform may send the additional information concerning the user to the IVR system device and/or the agent device. In some implementations, the communication platform may process the additional information concerning the user to generate speech and/or a DTMF tone and send the speech and/or DTMF tone to the IVR system device and/or the agent device.

Figure 1E:
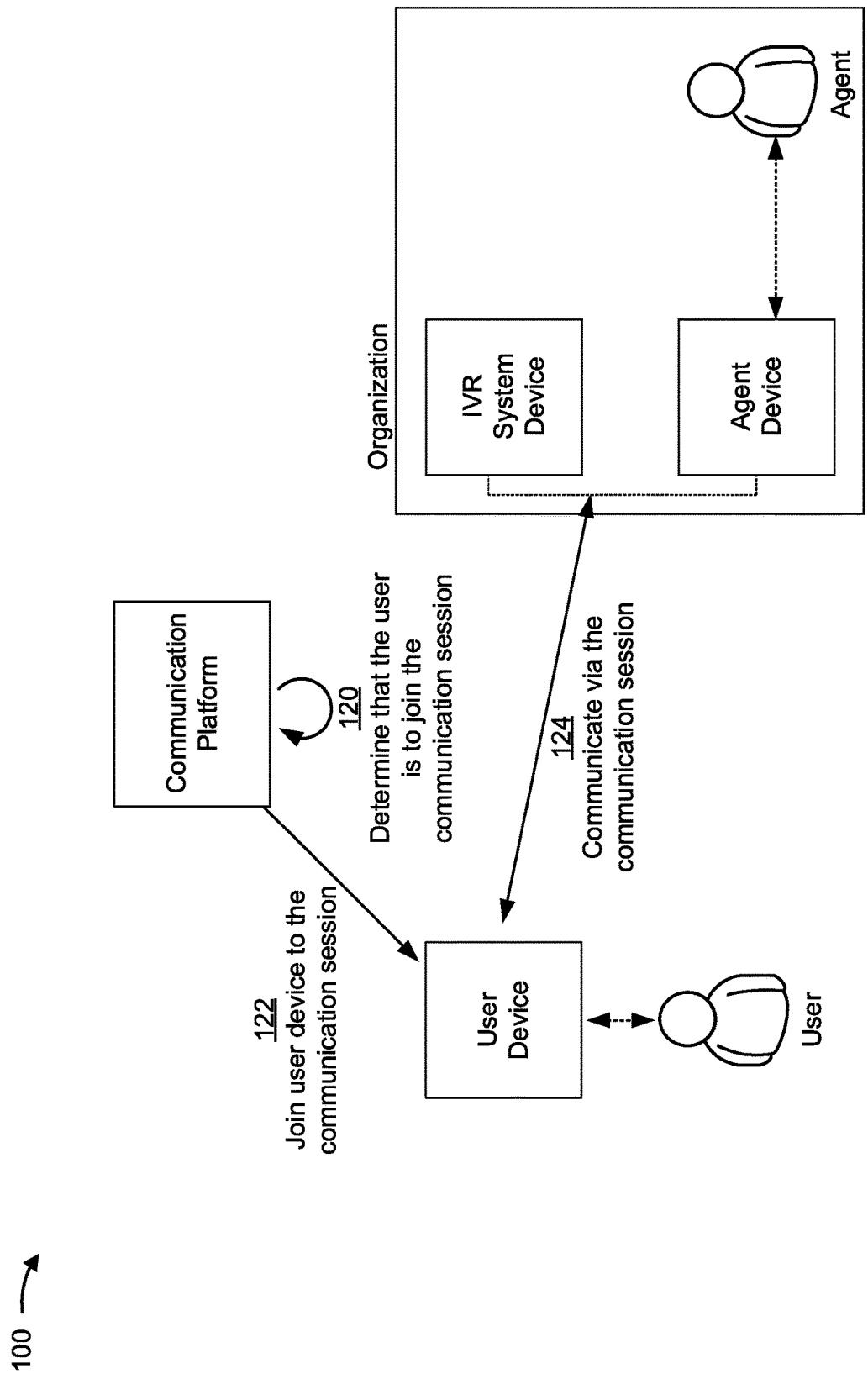

As shown in FIG. 1E and by reference number 120, the communication platform may determine that the user is to join the communication session to communicate with the IVR system device and/or the agent device. For example, the communication platform may receive a prompt that the communication platform does not know how to answer (e.g., the information concerning the user does not include information to respond to the prompt, such as a security question) and may determine that the communication platform does not have relevant information to answer the prompt and that the user needs to communicate with the IVR system device and/or the agent device to communicate the necessary information. As another example, the communication platform may determine that the IVR system device is repeatedly communicating the same information to the communication platform (e.g., the communication platform and the IVR system device are in a communication loop) and may determine that the user needs to communicate with the IVR system device to break the cycle. As another example, the communication platform may receive and process speech from the IVR system device and/or the agent device to determine that the IVR system device and/or the agent device has requested authorization to perform an action. For example, the communication platform may have traversed the menu tree of the IVR system device to reach a menu for performing an action, such as transferring funds, paying a bill, confirming an appointment, and/or the like, and that the IVR system device has requested authorization to perform the action.

In some implementations, the communication platform may determine, based on communicating with the IVR system device and/or the agent device, a time that the user is to interact with the IVR system device and/or the agent device via the communication session. For example, the communication platform may receive speech from the IVR system and/or the agent device and process the speech to determine the time. The communication platform may determine the time by determining how long the communication platform expects to communicate with the IVR system device and/or the agent device (e.g., to convey the information that concerns the user) until the user is needed to interact with the IVR system device and/or the agent device. In some implementations, the communication platform may use a machine learning model to determine the time. For example, the communication platform may train the machine learning model based on one or more parameters associated with communicating with the IVR system device and/or the agent device, such as the information that identifies the user, the organization, the at least one reason for the communication request, the at least one menu of the menu tree, the one or more first communications, the one or more second communications, and/or the like. The communication platform may train the machine learning model, according to the one or more parameters, using historical data associated with determining the time that the user is to interact with the IVR system device and/or the agent device via the communication session. Using the historical data and the one or more parameters as inputs to the machine learning model, the communication platform may determine the time that the user is to interact with the IVR system device and/or the agent device to enable the user to interact with the IVR system device and/or the agent device via the communication session. For example, the communication platform may determine that the user is to interact with the IVR system device and/or the agent device at a particular time of day.

In some implementations, the communication platform may determine an amount of time left until the time that the user is to interact with the IVR system device and/or the agent device. For example, the communication platform may determine that user is to interact with the IVR system device at the particular time of day and that the particular time of day is a particular amount of time away. In some implementations, the communication platform may receive speech from the IVR system and/or the agent device and process the speech to determine the amount of time left until the time that the user is to interact with the IVR system device and/or the agent device. For example, the speech may indicate an estimated wait time (e.g., "your estimated wait time is fifteen minutes") and the communication platform may process the speech to identify the estimated wait time until the time that the user is to interact with the IVR system device and/or the agent device.

In some implementations, the communication platform may generate a message that includes the time that the user is to interact with the IVR system device and/or the agent device, the amount of time left until the time, and/or the like. In some implementations, the communication platform may determine the time and/or the amount of time left until the time and/or generate the message on a scheduled basis (e.g., every minute, every 10 minutes, every 20 minutes, and/or the like), on an on-demand basis (e.g., when the user device requests the time and/or the amount of time left until the time and/or the like), on a triggered basis (e.g., upon the IVR system device playing hold music and/or the like), and/or the like. In some implementations, the communication platform may, on the scheduled basis, send the message (e.g., via a push functionality) to the user device and the user device may receive the message from the communication platform. In some implementations, the user device may process the message and display the time and/or the amount of time left until the time on the display of the user device. In some implementations, receiving the message by the user device, causes the display of the user device to display the message.

As shown by reference number 122, the communication platform may join the user device to the communication session. In some implementations, the communication platform may join the user device to the communication session at the time that the user is to interact with the IVR system device and/or the agent device. In some implementations, the communication platform may cause the user device to join the communication session at the time that the user is to interact with the IVR system device and/or the agent device. For example, the communication platform may determine that user device is to interact with the IVR system device immediately (e.g., upon determining that the user is to join the communication session) and may cause the user device to join the communication session as soon as possible. As another example, the communication platform may determine, based on the information concerning the user, a telephone number associated with the user device. The communication platform may initiate, prior to the time that the user is to interact with the IVR system device and/or the agent device and based on the telephone number associated with the user device, an additional communication session with the user device. The communication platform may then join the additional communication session to the communication session at the time that the user is to interact with the IVR system device and/or the agent device.

Additionally, or alternatively, after determining that the user device is to join the communication session, the communication platform may schedule a time for the user device to join the communication session. For example, the communication platform may end the current communication session, determine a time of availability of the user (e.g., by searching a calendar of the user), send a message to the user device indicating the time (e.g., a calendar meeting invite) that includes the information that identifies the user, the organization, the at least one reason for the communication request, and/or the like. The communication session may restart the communication session (or start a new communication session) at a time before the scheduled time so that user device may join the communication session at the scheduled time to allow the user device to communicate with IVR system device and/or the agent device.

In some implementations, the communication platform may cause, based on determining that the user is to communicate with the IVR system and/or the agent device, the user device to enable at least one component of the user device to allow the user to communicate with the IVR system and/or the agent device. For example, the communication platform may cause the user device to turn on a microphone of the user device to allow the user to speak to the IVR system device and/or the agent device via the user device. As shown by reference number 124, the user device may communicate, via the user device, with the IVR system device and/or the agent device via the communication session.

Figure 1F:
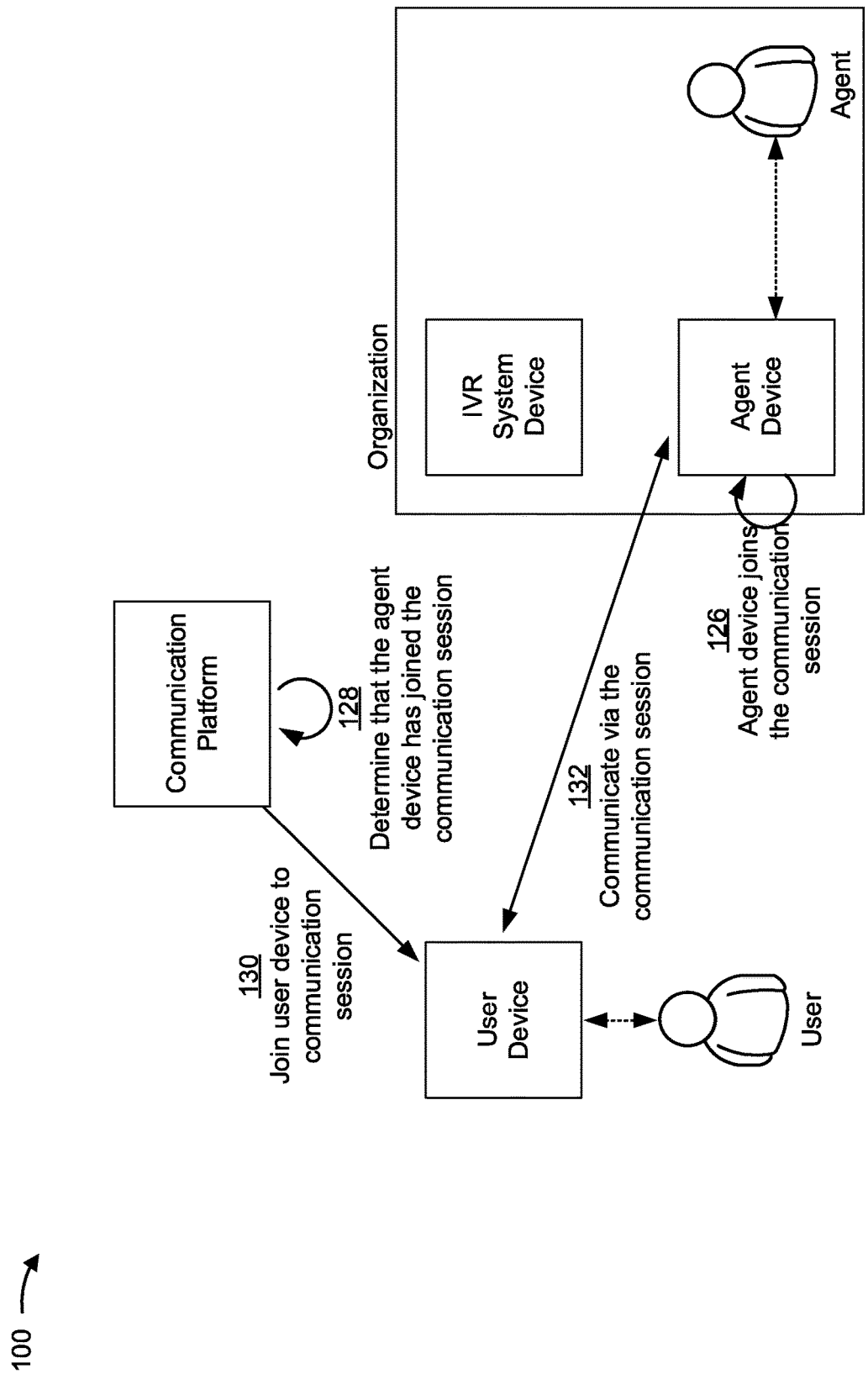

FIG. 1F shows a scenario where the communication platform has been communicating with the IVR system device via a communication session and then the agent device joins the communication session. As shown be reference 126, an agent of the organization may join the communication session using the agent device. For example, the communication platform and the IVR system device may have communicated for a period of time and the IVR system device determined that an agent was needed for further communication, and thus caused the agent, via the agent device, to join the communication session. As shown by reference number 128, the communication platform may determine that the agent device has joined the communication session. For example, the communication platform may receive and process speech from the agent device of the agent and determine that the speech is not associated with the IVR system, and therefore determine that the speech is associated with a human person.

As shown by reference number 130, based on determining that the agent device has joined the communication session, the communication platform may join the user device to the communication session. In some implementations, the communication platform may send a message to the user device that indicates the agent has joined the communication session. In some implementations, the communication platform may cause, based on determining that the agent of the organization has joined the communication session, the user device to join the communication session to enable the user to communicate with the agent device used by the agent of the organization.

As shown by reference number 132, the user, via the user device, may communicate with the agent, via the agent device, via the communication session. In some implementations, the communication platform may generate, after determining that the agent device has joined the communication session, an additional message indicating that the user will join the communication session and send the additional message to the agent device used by the agent of the organization via the communication session.

While the example implementations described above concern the communication platform automatically communicating with the IVR system device and/or the agent device and determining whether additional user information is needed and/or whether the user is to join the communication session, some example implementations include the user device performing the acts described above in connection with the communication platform, such as automatically communicating with the IVR system device and/or the agent device and determining whether additional user information is needed and/or whether the user is to join the communication session. For example, the user device may determine the information that identifies the user, the organization, the at least one reason for the communication request, and/or the like in a similar manner as described herein in relation to FIG. 1A. In another example, the user device may initiate a communication session with the IVR system device and/or the agent device and communicate with the IVR system device and/or the agent device in a similar manner as described herein in relation to FIG. 1B. In an additional example, the user device may determine information about the communication session and display the information about the communication session in a similar manner as described herein in relation to FIG. 1C. In another example, the user device may determine that additional information concerning the user is needed, obtain the additional information concerning the user, and send the additional information concerning the user to the IVR system device and/or the agent device via the communication session in a similar manner as described herein in relation to FIG. 1D. In an additional example, the user device may determine that the user is joining the communication session and enable the user to use the user device to communicate via the communication session in a similar manner as described herein in relation to FIG. 1E. In another example, the user device may determine that the agent, using the agent device, has joined the communication session and enable the user to use the user device to communicate via the communication session in a similar manner as described herein in relation to FIG. 1F. In such implementations, a communication platform is not needed.

As indicated above, FIGS. 1A-1F are provided merely as an example. Other examples may differ from what was described with regard to FIGS. 1A-1F.

Figure 2:
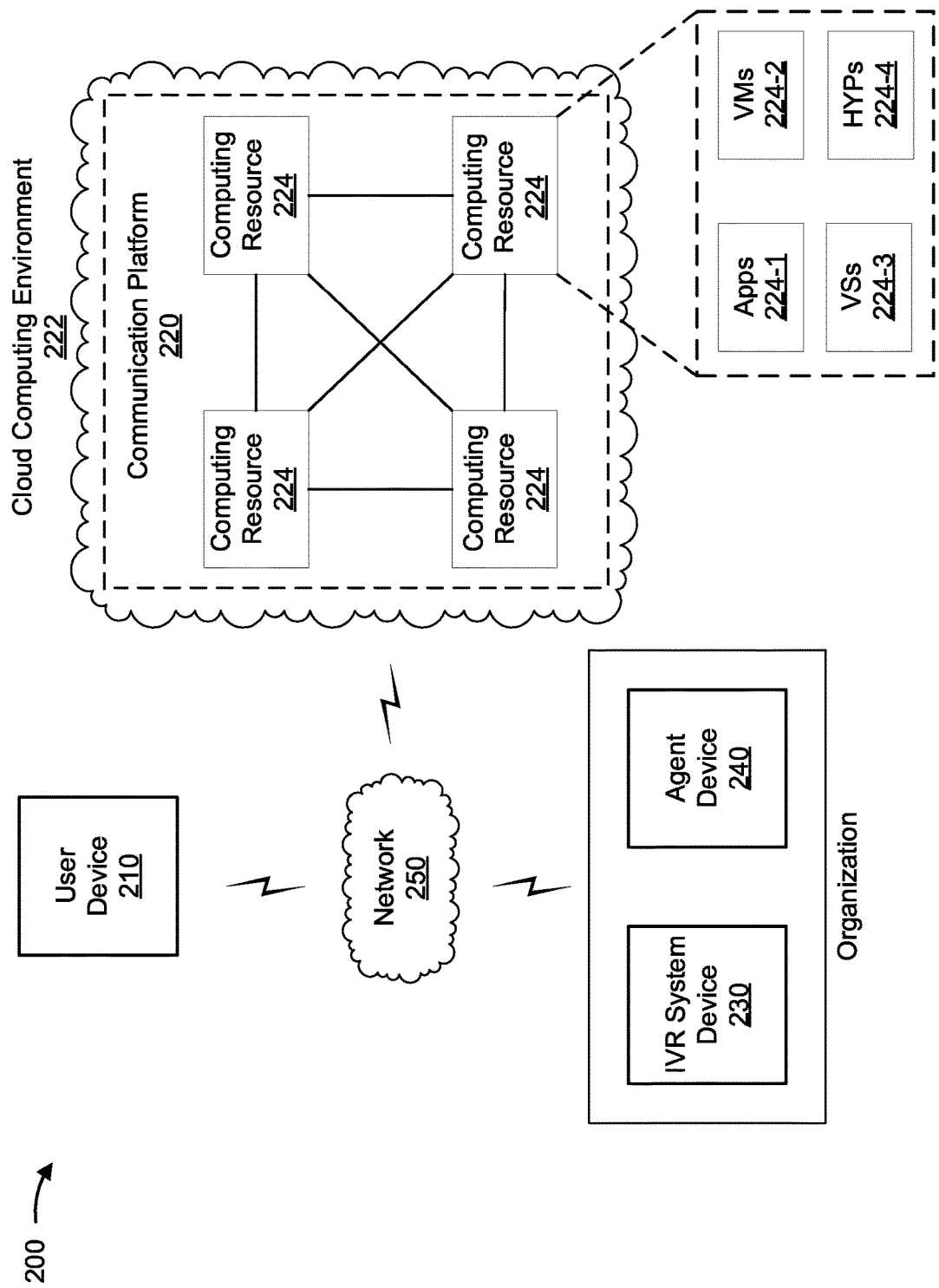
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a communication platform 220, an IVR system device 230, an agent device 240, and/or the like. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a computer (e.g., a desktop computer, a laptop computer, a tablet computer, a handheld computer, a server device, etc.), a mobile phone (e.g., a smart phone, a radiotelephone, etc.), an internet of things (IoT) device or smart appliance, or a similar device. In some implementations, user device 210 may receive information from and/or transmit information to communication platform 220, IVR system device 230, agent device 240, and/or the like.

Communication platform 220 includes one or more devices capable of communicating with an organization to convey key information and may determine when a user of user device 210 is to communicate with IVR system device 230 and/or agent device 240 of the organization. In some implementations, communication platform 220 may be designed to be modular such that certain software components may be swapped in or out depending on a particular need. As such, communication platform 220 may be easily and/or quickly reconfigured for different uses. In some implementations, communication platform 220 may receive information from and/or transmit information to user device 210, IVR system device 230, and/or agent device 240, such as via network. For example, communication platform 220 may receive a communication request from user device 210, may communicate with IVR system device 230 via a communication session, may send information about the communication session to user device 210, may communicate additional user information with user device 210, may join user device 210 to the communication session, and/or the like.

In some implementations, as shown, communication platform 220 may be hosted in a cloud computing environment 222. Notably, while implementations described herein describe communication platform 220 as being hosted in cloud computing environment 222, in some implementations, communication platform 220 may be non-cloud-based (i.e., may be implemented outside of a cloud computing environment) or may be partially cloud-based.

Cloud computing environment 222 includes an environment that hosts communication platform 220. Cloud computing environment 222 may provide computation, software, data access, storage, etc. services that do not require end-user knowledge of a physical location and configuration of system(s) and/or device(s) that hosts communication platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host communication platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210, IVR system device 230, and/or agent device 240. Application 224-1 may eliminate a need to install and execute the software applications on user device 210, IVR system device 230, and/or agent device 240. For example, application 224-1 may include software associated with communication platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210, IVR system device 230, and/or agent device 240), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

IVR system device 230 includes one or more devices capable of performing interactive voice response functions. In some implementations, IVR system device 230 may be a computing device, a server, a cloud computing device, and/or the like. In some implementations, a user using user device 210 and/or communication platform 220 may interact, via the one or more communication sessions, with IVR system device 230 through the use of voice and dual-tone multi-frequency signaling (DTMF) tones. In some implementations, IVR system device 230 may communicate with user device 210 via a communication session.

Agent device 240 includes one or more devices capable of performing functions associated with an agent. In some implementations, agent device 240 may be a communication and/or computing device, such as a mobile phone, a smartphone, a laptop computer, a tablet computer, and/or the like. In some implementations, a user using user device 210 and/or communication platform 220 may interact, via the one or more communication sessions, with an agent of the organization using agent device 240 through the use of voice. In some implementations, agent device 240 may communicate with user device 210 via a communication session.

Network 250 includes one or more wired and/or wireless networks. For example, network 250 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
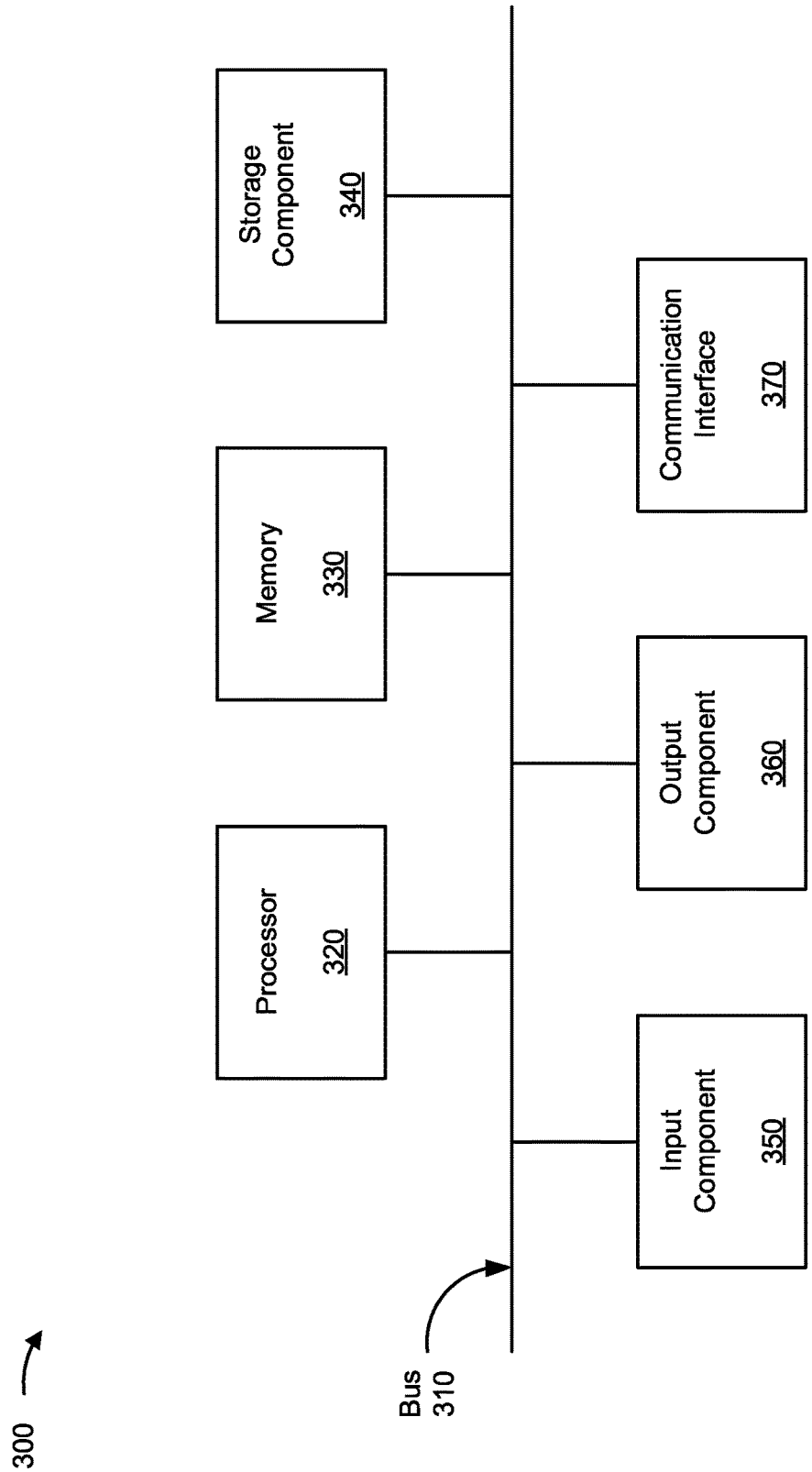
FIG. 3 is a diagram of example components of one or more devices of FIG. 2.

FIG. 3 is a diagram of example components of a device 300. Device 300 may correspond to user device 210, communication platform 220, IVR system device 230, agent device 240, and/or the like. In some implementations, user device 210, communication platform 220, IVR system device 230, agent device 240, and/or the like may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
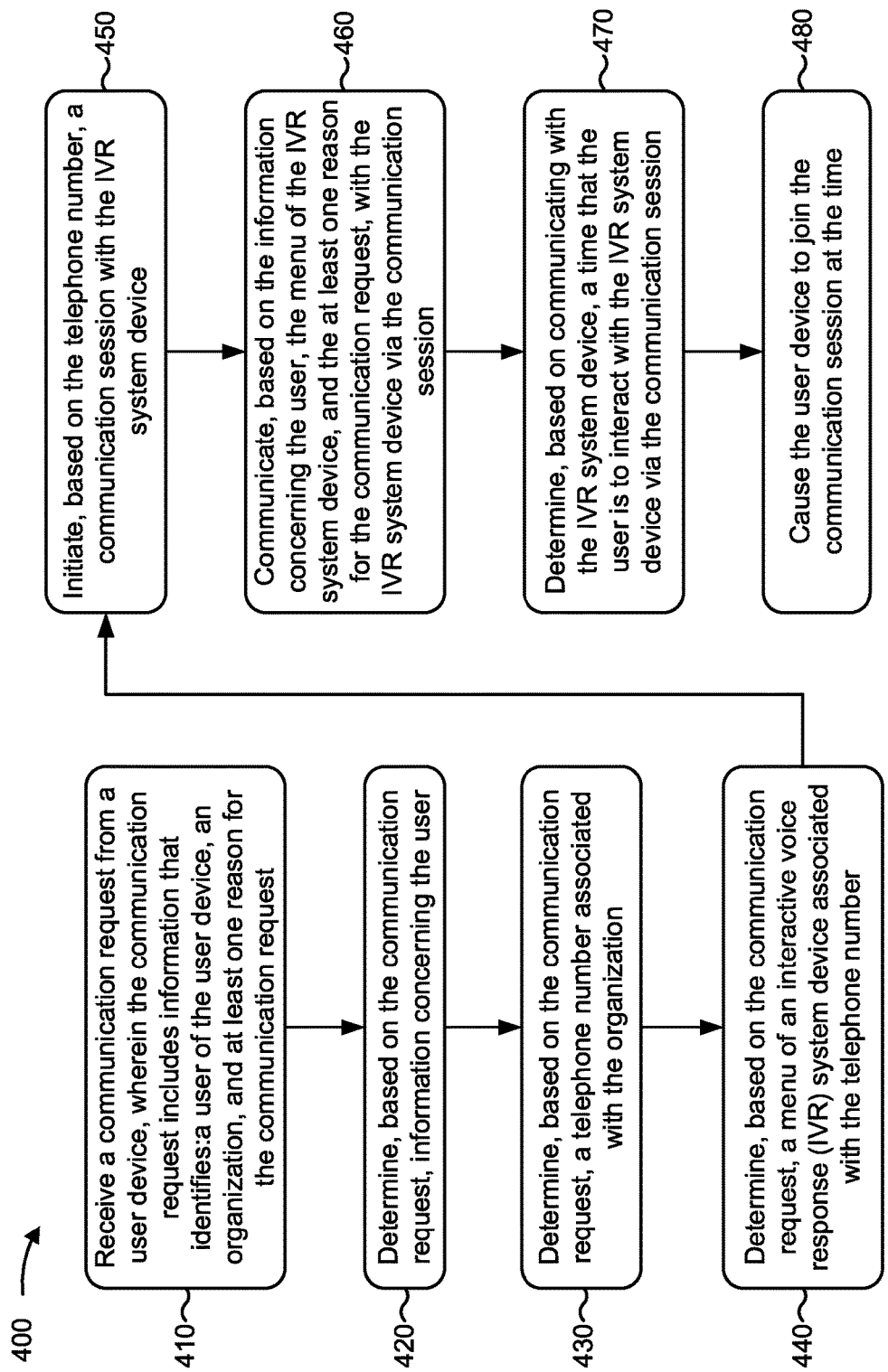

FIG. 4 is a flow chart of an example process 400 for interacting with an interactive voice response system device or agent device of an organization. In some implementations, one or more process blocks of FIG. 4 may be performed by a communication platform (e.g., communication platform 220). In some implementations, one or more process blocks of FIG. 4 may be performed by another device or a group of devices separate from or including the communication platform, such as a user device (e.g., user device 210), an IVR system device (e.g., IVR system device 230), an agent device (e.g., agent device 240), and/or the like.

As shown in FIG. 4, process 400 may include receiving a communication request from a user device, wherein the communication request includes information that identifies: a user of the user device, an organization, and at least one reason for the communication request (block 410). For example, the communication platform (e.g., using computing resource 224, processor 320, memory 330, storage component 340, input component 350, communication interface 370, and/or the like) may receive a communication request from a user device, as described above. In some implementations, the communication request may include information that identifies a user of the user device, an organization, and at least one reason for the communication request.

As further shown in FIG. 4, process 400 may include determining, based on the communication request, information concerning the user (block 420). For example, the communication platform (e.g., using computing resource 224, processor 320, memory 330, storage component 340, and/or the like) may determine, based on the communication request, information concerning the user, as described above.

As further shown in FIG. 4, process 400 may include determining, based on the communication request, a telephone number associated with the organization (block 430). For example, the communication platform (e.g., using computing resource 224, processor 320, memory 330, storage component 340, and/or the like) may determine, based on the communication request, a telephone number associated with the organization, as described above.

As further shown in FIG. 4, process 400 may include determining, based on the communication request, a menu of an interactive voice response (IVR) system device associated with the telephone number (block 440). For example, the communication platform (e.g., using computing resource 224, processor 320, memory 330, storage component 340, communication interface 370, and/or the like) may determine, based on the communication request, a menu of an IVR system device associated with the telephone number, as described above.

As further shown in FIG. 4, process 400 may include initiating, based on the telephone number, a communication session with the IVR system device (block 450). For example, the communication platform (e.g., using computing resource 224, processor 320, memory 330, storage component 340, input component 350, output component 360, communication interface 370, and/or the like) may initiate, based on the telephone number, a communication session with the IVR system device, as described above.

As further shown in FIG. 4, process 400 may include communicating, based on the information concerning the user, the menu of the IVR system device, and the at least one reason for the communication request, with the IVR system device via the communication session (block 460). For example, the communication platform (e.g., using computing resource 224, processor 320, memory 330, storage component 340, input component 350, output component 360, communication interface 370, and/or the like) may communicate, based on the information concerning the user, the menu of the IVR system device, and the at least one reason for the communication request, with the IVR system device via the communication session, as described above.

As further shown in FIG. 4, process 400 may include determining, based on communicating with the IVR system device, a time that the user is to interact with the IVR system device via the communication session (block 470). For example, the communication platform (e.g., using computing resource 224, processor 320, memory 330, storage component 340, and/or the like) may determine, based on communicating with the IVR system device, a time that the user is to interact with the IVR system device via the communication session, as described above.

As further shown in FIG. 4, process 400 may include causing the user device to join the communication session at the time (block 480). For example, the communication platform (e.g., using computing resource 224, processor 320, memory 330, storage component 340, input component 350, output component 360, communication interface 370, and/or the like) may cause the user device to join the communication session at the time, as described above.

Process 400 may include additional implementations, such as any single implementation or any combination of implementations described below and/or in connection with one or more other processes described elsewhere herein.

In some implementations, the information concerning the user may be a name of the user, an address of the user, a username of the user, an identification string of the user, a password of the user, a security response of the user, and/or an identifier of an account of the user. In some implementations, when communicating with the IVR system device via the communication session, the communication platform may receive a spoken-word prompt from the IVR system device via the communication session, may process the spoken-word prompt using a natural language processing technique to determine at least one query, may determine, based on the information concerning the user, the menu of the IVR system device, and the at least one reason for the communication request, an answer to the query, may generate, based on the answer, a spoken-word response using a text-to-speech technique, and may send the spoken-word response to the IVR system device via the communication session.

In some implementations, when communicating with the IVR system device via the communication session, the communication platform may receive first speech from the IVR system device, may generate, based on the first speech, second speech, may send the second speech to the IVR system device, may create a transcription of the first speech and the second speech, and may send the transcription to the user device. In some implementations, when determining the time that the user is to interact with the IVR system device via the communication session, the communication platform may receive speech from the IVR system device, may process the speech using a machine learning technique to determine the time, and may send a message to the user device that includes the time.

In some implementations, when determining the time that the user is to interact with the IVR system device via the communication session, the communication platform may determine an amount of time left until the time, and may cause display of the amount of time left until the time on a display of the user device. In some implementations, when causing the user device to join the communication session at the time, the communication platform may initiate, prior to the time, an additional communication session with the user device, and may join the additional communication session to the communication session at the time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for interacting with an interactive voice response system device or agent device of an organization. In some implementations, one or more process blocks of FIG. 5 may be performed by a user device (e.g., user device 210). In some implementations, one or more process blocks of FIG. 5 may be performed by another device or a group of devices separate from or including the user device, such as a communication platform (e.g., communication platform 220), an IVR system device (e.g., IVR system device 230), an agent device (e.g., agent device 240), and/or the like.

As shown in FIG. 5, process 500 may include obtaining a communication request via a user interface of the user device, wherein the communication request includes information that identifies a user, an organization, and at least one reason for the communication request (block 510). For example, the user device (e.g., using processor 320, memory 330, storage component 340, input component 350, communication interface 370, and/or the like) may obtain a communication request via a user interface of the user device, as described above. In some implementations, the communication request may include information that identifies a user, an organization, and at least one reason for the communication request.

As further shown in FIG. 5, process 500 may include determining, based on the communication request, information concerning the user (block 520). For example, the user device (e.g., using processor 320, memory 330, storage component 340, and/or the like) may determine, based on the communication request, information concerning the user, as described above.

As further shown in FIG. 5, process 500 may include determining, based on the communication request, a telephone number associated with the organization (block 530). For example, the user device (e.g., using processor 320, memory 330, storage component 340, and/or the like) may determine, based on the communication request, a telephone number associated with the organization, as described above.

As further shown in FIG. 5, process 500 may include initiating, based on the telephone number, a communication session with an interactive voice response (IVR) system device or an agent device of the organization (block 540). For example, the user device (e.g., using processor 320, memory 330, storage component 340, input component 350, output component 360, communication interface 370, and/or the like) may initiate, based on the telephone number, a communication session with an interactive voice response (IVR) system device or an agent device of the organization, as described above.

As further shown in FIG. 5, process 500 may include communicating, based on the information concerning the user and the at least one reason for the communication request, with the IVR system device or the agent device of the organization via the communication session (block 550). For example, the user device (e.g., using processor 320, memory 330, storage component 340, input component 350, output component 360, communication interface 370, and/or the like) may communicate, based on the information concerning the user and the at least one reason for the communication request, with the IVR system device or the agent device of the organization via the communication session, as described above.

As further shown in FIG. 5, process 500 may include determining, based on communicating with the IVR system device or the agent device of the organization, that the user is to communicate with the IVR system device or the agent device of the organization via the communication session (block 560). For example, the user device (e.g., using processor 320, memory 330, storage component 340, and/or the like) may determine, based on communicating with the IVR system device or the agent device of the organization, that the user is to communicate with the IVR system device or the agent device of the organization via the communication session, as described above.

As further shown in FIG. 5, process 500 may include causing, based on determining that the user is to communicate with the IVR system device or the agent device of the organization via the communication session, the user device to enable at least one component of the user device to allow the user to communicate with the IVR system device or the agent device via the communication session (block 570). For example, the user device (e.g., using processor 320, memory 330, storage component 340, input component 350, output component 360, communication interface 370, and/or the like) may cause, based on determining that the user is to communicate with the IVR system device or the agent device of the organization via the communication session, the user device to enable at least one component of the user device to allow the user to communicate with the IVR system device or the agent device via the communication session, as described above.

Process 500 may include additional implementations, such as any single implementation or any combination of implementations described below and/or in connection with one or more other processes described elsewhere herein.

In some implementations, when initiating the communication session with the IVR system device or the agent device of the organization, the user device may cause the user device to dial the telephone number to initiate the communication session. In some implementations, when communicating with the IVR system device or the agent device of the organization via the communication session, the user device may receive speech from the IVR system device or the agent device of the organization via the communication session, may determine one or more words of the speech using a voice-to-text technique, and may cause display of the one or more words of the speech on a display of the user device.

In some implementations, when communicating with the IVR system device or the agent device of the organization via the communication session, the user device may generate one or more words based on the information concerning the user and the at least one reason for the communication request, may process the one or more words using a text-to-speech technique to generate speech, may send the speech to the IVR system device or the agent device of the organization via the communication session, and may cause, after sending the speech, display of the one or more words on a display of the user device. In some implementations, when determining that the user is to communicate with the IVR system device or the agent device of the organization via the communication session, the user device may receive speech from the IVR system device or the agent device of the organization via the communication session, and may determine that user device does not have relevant information to respond to the speech.

In some implementations, when determining that the user is to communicate with the IVR system device or the agent device of the organization via the communication session, the user device may receive speech from the IVR system device or the agent device of the organization via the communication session, and may process the speech to determine that the IVR system device or the agent device of the organization has requested authorization to perform an action. In some implementations, the at least one component of the user device may be a microphone, and, when causing the user device to enable the at least one component of the user device to allow the user to communicate with the IVR system device or the agent device via the communication session, the user device may turn on the microphone.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for interacting with an interactive voice response system device or agent device of an organization. In some implementations, one or more process blocks of FIG. 6 may be performed by a communication platform (e.g., communication platform 220). In some implementations, one or more process blocks of FIG. 6 may be performed by another device or a group of devices separate from or including the communication platform, such as a user device (e.g., user device 210), an IVR system device (e.g., IVR system device 230), an agent device (e.g., agent device 240), and/or the like.

As shown in FIG. 6, process 600 may include receiving a communication request from a user device, wherein the communication request includes information concerning a user of the user device, information concerning an organization, and at least one reason for the communication request (block 610). For example, the communication platform (e.g., using computing resource 224, processor 320, memory 330, storage component 340, input component 350, communication interface 370, and/or the like) may receive a communication request from a user device, as described above. In some implementations, the communication request may include information concerning a user of the user device, information concerning an organization, and at least one reason for the communication request.

As further shown in FIG. 6, process 600 may include initiating, based on the information concerning the organization, a communication session with an interactive voice response (IVR) system of the organization (block 620). For example, the communication platform (e.g., using computing resource 224, processor 320, memory 330, storage component 340, input component 350, output component 360, communication interface 370, and/or the like) may initiate, based on the information concerning the organization, a communication session with an interactive voice response (IVR) system of the organization, as described above.

As further shown in FIG. 6, process 600 may include communicating, based on the information concerning the user and the at least one reason for the communication request, with the IVR system device via the communication session (block 630). For example, the communication platform (e.g., using computing resource 224, processor 320, memory 330, storage component 340, input component 350, output component 360, communication interface 370, and/or the like) may communicate, based on the information concerning the user and the at least one reason for the communication request, with the IVR system device via the communication session, as described above.

As further shown in FIG. 6, process 600 may include determining, after communicating with the IVR system device via the communication session, that an agent device of the organization has joined the communication session (block 640). For example, the communication platform (e.g., using computing resource 224, processor 320, memory 330, storage component 340, and/or the like) may determine, after communicating with the IVR system device via the communication session, that an agent device of the organization has joined the communication session, as described above.

As further shown in FIG. 6, process 600 may include sending a message to the user device that indicates the agent device of the organization has joined the communication session (block 650). For example, the communication platform (e.g., using computing resource 224, processor 320, memory 330, storage component 340, output component 360, communication interface 370, and/or the like) may send a message to the user device that indicates the agent device of the organization has joined the communication session, as described above.

As further shown in FIG. 6, process 600 may include communicating, based on the information concerning the user and the at least one reason for the communication request, with the agent device of the organization via the communication session (block 660). For example, the communication platform (e.g., using computing resource 224, processor 320, memory 330, storage component 340, input component 350, output component 360, communication interface 370, and/or the like) may communicate, based on the information concerning the user and the at least one reason for the communication request, with the agent device of the organization via the communication session, as described above.

As further shown in FIG. 6, process 600 may include causing, based on determining that the agent device of the organization has joined the communication session, the user device to join the communication session to enable the user to communicate with the agent device of the organization (block 670). For example, the communication platform (e.g., using computing resource 224, processor 320, memory 330, storage component 340, input component 350, output component 360, communication interface 370, and/or the like) may cause, based on determining that the agent device of the organization has joined the communication session, the user device to join the communication session to enable the user to communicate with the agent device of the organization, as described above.

Process 600 may include additional implementations, such as any single implementation or any combination of implementations described below and/or in connection with one or more other processes described elsewhere herein.

In some implementations, when communicating with the IVR system device via the communication session, the communication platform may send at least one text-to-speech word to the IVR system device via the communication session, or may send at least one dual tone multi-frequency (DTMF) tone to the IVR system device via the communication session. In some implementations, when communicating with the IVR system device via the communication session, the communication platform may send, to the user device, an additional message that includes a query regarding additional information concerning the user, may receive, from the user device, a response that includes the additional information concerning the user, may generate speech based on the additional information concerning the user, and may send the speech to the IVR system device via the communication session.

In some implementations, when communicating with the IVR system device via the communication session, the communication platform may receive one or more first communications from the IVR system device, may send, based on the one or more first communications, one or more second communications to the IVR system device, may store the one or more first communications and the one or more second communications, and may send the one or more first communications and the one or more second communications to the user device for display on a display of the user device.

In some implementations, when determining that the agent device of the organization has joined the communication session, the communication platform may receive speech from the agent device of the organization via the communication session, and may process the speech to determine that the speech is not associated with the IVR system device. In some implementations, the communication platform may generate, after determining that the agent device of the organization has joined the communication session, an additional message indicating that the user will join the communication session, and may send the additional message to the agent device of the organization via the communication session.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   determining, by one or more devices of a communication platform, that a user is to join a communication session to communicate with an interactive voice response (IVR) system device or an agent device via the communication session;
   determining, by the one or more devices, after the communication session is initiated, and based on determining that the user is to join the communication session, a time that the user is to interact with the IVR system device or the agent device via the communication session; and
   causing, by the one or more devices and based on the time, a user device, of the user, to enable at least one component of the user device to allow the user to join the communication session to communicate with the IVR system device or the agent device via the communication session.

2. The method of claim 1, further comprising:
   receiving a prompt; and
   determining that the communication platform does not have relevant information to answer the prompt,
   wherein determining that the user is to join the communication session comprises:
      determining that the user is to join the communication session based on determining that the communication platform does not have relevant information to answer the prompt.

3. The method of claim 1, further comprising:
   determining that the IVR system device is repeatedly communicating the same information to the communication platform,
   wherein determining that the user is to join the communication session comprises:
      determining that the user is to join the communication session based on determining that the IVR system device is repeatedly communicating the same information to the communication platform.

4. The method of claim 1, further comprising:
   communicating with the IVR system device or the agent device,
   wherein determining the time that the user is to interact with the IVR system device or the agent device via the communication session comprises:
      determining, based on communicating with the IVR system device or the agent device, the time that the user is to interact with the IVR system device or the agent device via the communication session.

5. The method of claim 1, further comprising:
   training a machine learning model based on one or more parameters associated with communicating with the IVR system device and/or the agent device,
   wherein determining the time that the user is to interact with the IVR system device or the agent device via the communication session comprises:
      determining, using the machine learning model, the time that the user is to interact with the IVR system device or the agent device via the communication session.

6. The method of claim 1, further comprising:
   generating a message that indicates at least one of the time or an amount of time left until the time; and
   sending the message to the user device.

7. The method of claim 1, further comprising:
   initiating, prior to the time and based on a telephone number associated with the user device, an additional communication session with the user device; and
   joining the additional communication session to the communication session at the time that the user is to interact with the IVR system device or the agent device.

8. The method of claim 1, wherein causing the user device to enable the at least one component of the user device comprises:
   causing the user device to turn on a microphone of the user device to allow the user to speak to the IVR system device or the agent device via the user device.

9. A device, comprising:
   one or more memories; and
   one or more processors communicatively coupled to the one or more memories, configured to:
      determine that a user is to join a communication session to communicate with an interactive voice response (IVR) system device or an agent device via the communication session;
      determine, after the communication session is initiated and based on determining that the user is to join the communication session, a time that the user is to interact with the IVR system device or the agent device via the communication session; and
      cause, based on the time, a user device, of the user, to enable at least one component of the user device to allow the user to join the communication session to communicate with the IVR system device or the agent device via the communication session.

10. The device of claim 9, wherein the one or more processors are further configured to:
    receive a prompt; and
    determine that the device does not have relevant information to answer the prompt,
       wherein the one or more processors, when determining that the user is to join the communication session, are configured to:
          determine that the user is to join the communication session based on determining that the device does not have relevant information to answer the prompt.

11. The device of claim 9, wherein the one or more processors are further configured to:
    communicate with the IVR system device or the agent device,
    wherein the one or more processors, when determining the time that the user is to interact with the IVR system device or the agent device via the communication session, are configured to:
       determine, based on communicating with the IVR system device or the agent device, the time that the user is to interact with the IVR system device or the agent device via the communication session.

12. The device of claim 9, wherein the one or more processors are further configured to:
    generate a message that indicates at least one of the time or an amount of time left until the time; and
    send the message to the user device.

13. The device of claim 9, wherein the one or more processors are further configured to:
    initiate, prior to the time and based on a telephone number associated with the user device, an additional communication session with the user device; and
    join the additional communication session to the communication session at the time that the user is to interact with the IVR system device or the agent device.

14. The device of claim 9, wherein the one or more processors, when causing the user device to enable the at least one component of the user device, are configured to:
    cause the user device to turn on a microphone of the user device to allow the user to speak to the IVR system device or the agent device via the user device.

15. A non-transitory computer-readable medium storing instructions, the instructions comprising:
    one or more instructions that, when executed by one or more processors, cause the one or more processors to:
       determine that a user is to join a communication session to communicate with an interactive voice response (IVR) system device or an agent device via the communication session;
       determine, after the communication session is initiated and based on determining that the user is to join the communication session, a time that the user is to interact with the IVR system device or the agent device via the communication session; and
       cause, based on the time, a user device, of the user, to enable at least one component of the user device to allow the user to join the communication session to communicate with the IVR system device or the agent device via the communication session.

16. The non-transitory computer-readable medium of claim 15, wherein the one or more instructions, when executed by the one or more processors, further cause the one or more processors to:
    determine that the IVR system device is repeatedly communicating the same information,
       wherein the one or more instructions, that cause the one or more processors to determine that the user is to join the communication session, cause the one or more processors to:
          determine that the user is to join the communication session based on determining that the IVR system device is repeatedly communicating the same information.

17. The non-transitory computer-readable medium of claim 15, wherein the one or more instructions, when executed by the one or more processors, further cause the one or more processors to:
    train a machine learning model based on one or more parameters associated with communicating with the IVR system device or the agent device,
       wherein the one or more instructions, that cause the one or more processors to determine the time that the user is to interact with the IVR system device or the agent device via the communication session, cause the one or more processors to:
          determine, using the machine learning model, the time that the user is to interact with the IVR system device or the agent device via the communication session.

18. The non-transitory computer-readable medium of claim 15, wherein the one or more instructions, when executed by the one or more processors, further cause the one or more processors to:
    generate a message that indicates at least one of the time or an amount of time left until the time; and
    send the message to the user device.

19. The non-transitory computer-readable medium of claim 15, wherein the one or more instructions, when executed by the one or more processors, further cause the one or more processors to:
    initiate, prior to the time and based on a telephone number associated with the user device, an additional communication session with the user device; and
    join the additional communication session to the communication session at the time that the user is to interact with the IVR system device or the agent device.

20. The non-transitory computer-readable medium of claim 15, wherein the one or more instructions, that cause the one or more processors to cause the user device to enable the at least one component of the user device, cause the one or more processors to:
    cause the user device to turn on a microphone of the user device to allow the user to speak to the IVR system device or the agent device via the user device.

* * * * *